(12) United States Patent
Yamamoto

(10) Patent No.: US 9,588,400 B2
(45) Date of Patent: Mar. 7, 2017

(54) PHOTOGRAPHING APPARATUS AND PHOTOGRAPHING CONTROL SYSTEM

(71) Applicant: RICOH IMAGING COMPANY, LTD., Tokyo (JP)

(72) Inventor: Yasuhiro Yamamoto, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 14/773,844

(22) PCT Filed: Mar. 3, 2014

(86) PCT No.: PCT/JP2014/055247
§ 371 (c)(1),
(2) Date: Sep. 9, 2015

(87) PCT Pub. No.: WO2014/156484
PCT Pub. Date: Oct. 2, 2014

(65) Prior Publication Data
US 2016/0026068 A1    Jan. 28, 2016

(30) Foreign Application Priority Data

Mar. 27, 2013  (JP) ................................ 2013-065433

(51) Int. Cl.
*H04N 5/262*  (2006.01)
*H04N 5/232*  (2006.01)
(Continued)

(52) U.S. Cl.
CPC ................. *G03B 5/00* (2013.01); *G06T 5/20* (2013.01); *H04N 5/2253* (2013.01);
(Continued)

(58) Field of Classification Search
CPC .......... G03B 5/00; G06T 5/20; H04N 5/2253; H04N 5/23245; H04N 5/23287; H04N 5/2353; H04N 5/2621
(Continued)

(56) References Cited

U.S. PATENT DOCUMENTS 6,587,148 B1   7/2003   Takeda et al.
8,150,201 B2   4/2012   Kasai et al.
(Continued)

FOREIGN PATENT DOCUMENTS

JP     09-116910      5/1997
JP     2007-142702    6/2007
(Continued)

OTHER PUBLICATIONS

U.S. Appl. No. 14/765,666 to Masakazu Terauchi et al., filed Aug. 4, 2015.
(Continued)

*Primary Examiner* — Tuan Ho
*Assistant Examiner* — Marly Camargo
(74) *Attorney, Agent, or Firm* — Greenblum & Bernstein, P.L.C.

(57) ABSTRACT

An optimum low-pass filter effect according to various photographing condition parameters related to photographing conditions is obtained with flexibility without forcing the user to perform a troublesome manual operation in a photographing apparatus which drives an image sensor to obtain an optical low-pass filter effect.

The photographing condition parameter setters set parameters related to photographing conditions. The image sensor drive controller changes the drive range of the image sensor and the optical low-pass filter effect, which are defined by
(Continued)

the image sensor driver, based on the photographing condition parameters set by the photographing condition parameter setters.

5 Claims, 5 Drawing Sheets

(51) Int. Cl.
  *H04N 5/235* (2006.01)
  *G03B 5/00* (2006.01)
  *G06T 5/20* (2006.01)
  *H04N 5/225* (2006.01)

(52) U.S. Cl.
  CPC ....... *H04N 5/2353* (2013.01); *H04N 5/23245* (2013.01); *H04N 5/23287* (2013.01); *H04N 5/2621* (2013.01); *G03B 2205/0038* (2013.01); *G03B 2207/005* (2013.01)

(58) Field of Classification Search
  USPC ........ 348/208.99–208.16, 218.1, 219.1, 342, 348/208.99–208.16; 382/260–265, 382/260–265
  See application file for complete search history.

(56) References Cited

U.S. PATENT DOCUMENTS

| | | | |
|---|---|---|---|
| 8,345,149 B2* | 1/2013 | Yamazaki | G02B 5/005 348/345 |
| 8,717,450 B2* | 5/2014 | Baker | G01C 11/02 348/208.14 |
| 2003/0011747 A1* | 1/2003 | Lenz | H04N 3/1587 352/166 |
| 2008/0219585 A1 | 9/2008 | Kasai et al. | |
| 2010/0079825 A1* | 4/2010 | Yamazaki | G02B 27/46 358/474 |
| 2016/0269606 A1* | 9/2016 | Numako | G03B 5/00 |
| 2016/0269643 A1* | 9/2016 | Numako | G03B 5/00 |

FOREIGN PATENT DOCUMENTS

| | | |
|---|---|---|
| JP | 2008-035241 | 2/2008 |
| JP | 2008-227697 | 9/2008 |

OTHER PUBLICATIONS

U.S. Appl. No. 14/769,633 to Yasuhiro Yamamoto, filed Aug. 21, 2015.

* cited by examiner

Fig. 4
(A) 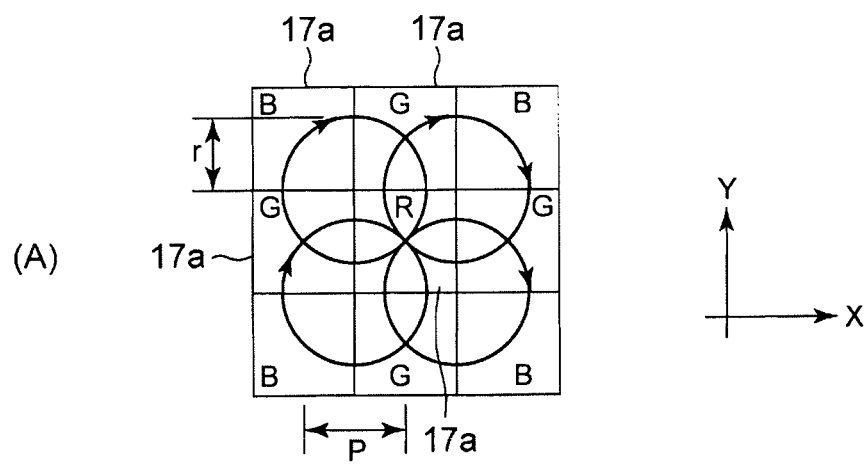
(B) 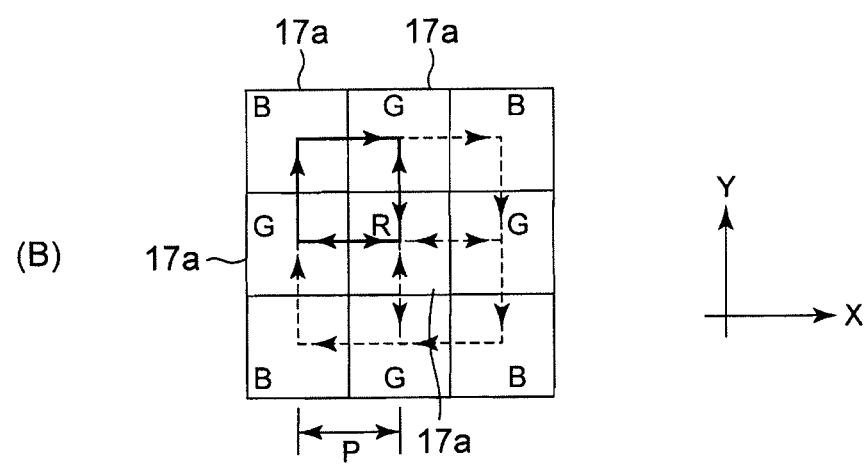

(A)  (B)

Vivid Mode →LPF Effect ON (Small, Medium and Large)
Natural Mode→LPF Effect OFF

ISO100 →LPF Effect "LARGE"
ISO400 →LPF Effect "SMALL"
ISO1600→LPF Effect OFF

ISO100 →LPF effect OFF
ISO400 →LPF Effect OFF
ISO1600→LPF Effect ON (Small, Medium and Large)

PHOTOGRAPHING APPARATUS AND PHOTOGRAPHING CONTROL SYSTEM

TECHNICAL FIELD

The present invention relates to a photographing apparatus and a photographing control system which are capable of obtaining an optical low-pass filter effect without the use of an optical low-pass filter.

BACKGROUND ART

Image sensors for use in photographing apparatuses such as digital still cameras, digital video cameras, or the like, sometimes create moiré and false color, etc., that do not originally exist on an object if light rays emanating from the object contain components of spatial frequency that exceeds the limit spatial frequency of the image sensor. To reduce the occurrence of such phenomena, an optical low-pass filter is conventionally used; however, if an optical low-pass filter is used, resolving power, a sense of resolution and contrast deteriorate.

Whereas, Patent Literature 1 discloses a photographing apparatus that achieves an optical low-pass filter effect to eliminate moiré, false color, etc., without the use of an optical low-pass filter by receiving object-emanating light rays via a plurality of pixels of different colors while moving an image sensor (moving member) in directions orthogonal to an optical axis of a photographing optical system.

CITATION LIST

Patent Literature

Patent Literature 1: Japanese Unexamined Patent Publication No. 2008-35241

SUMMARY OF THE INVENTION

Technical Problem

However, the photographing apparatus in Patent Literature 1 is merely an apparatus in which the user manually selects whether or not to obtain an optical low-pass filter effect by driving the image sensor, which is troublesome in operation. In addition, it is difficult to obtain an optimum low-pass filter effect according to various photographing condition parameters related to photographing conditions (e.g., portrait photography mode and scene photography mode, vivid mode and natural mode, and high-sensitivity photography mode and low-sensitivity photography mode) with flexibility.

The present invention has been completed based on the above described problems, and an object of the present invention is to obtain an optimum low-pass filter effect according to various photographing condition parameters related to photographing conditions with flexibility, without forcing the user to perform a troublesome manual operation in a photographing apparatus and a photographing control system which can obtain an optical low-pass filter effect by driving an image sensor (moving member).

Solution to Problem

The photographing apparatus according to the present invention is provided, including an image sensor, to which an object image that is formed from object-emanating light rays passed through a photographing optical system is exposed, and which converts the object image thus exposed into an electrical pixel signal; a moving member driver which provides an optical low-pass filter effect by making the object-emanating light rays incident on a plurality of pixels of the image sensor which are mutually different in detection color by driving a moving member that includes at least one of a lens which constitutes at least a portion of optical elements including the photographing optical system for formation of the object image and the image sensor, in directions orthogonal to an optical axis of the photographing optical system; a photographing condition parameter setter which sets a parameter related to a photographing condition; and a moving member drive controller which changes a drive range of the moving member and the optical low-pass filter effect, which are defined by the moving member driver, based on the photographing condition parameter that is set by the photographing condition parameter setter.

The terms "the drive range of the image sensor (moving member) and the optical low-pass filter effect that are determined by the image sensor driver (moving member driver)" are used under the concept that includes zero. Specifically, the image sensor drive controller (moving member drive controller) is capable of performing both a control for providing an optical low-pass filter effect, by driving the image sensor (moving member) via the image sensor driver (moving member driver), and a control for providing no optical low-pass filter effect, by not driving the image sensor (moving member) via the image sensor driver (moving member driver).

It is desirable for the photographing condition parameter setter to include a photographing mode setter which sets, as the photographing condition parameter, at least one of a portrait photography mode for photographing people as a photographic subject and a landscape photography mode for photographing a landscape as a photographic subject. The moving member drive controller makes the drive range of the moving member and the optical low-pass filter effect that are defined by the moving member driver when the portrait photography mode is set by the photographing mode setter greater than the drive range of the moving member and the optical low-pass filter effect that are defined by the moving member driver when the landscape photography mode is set by the photographing mode setter.

It is desirable for the photographing condition parameter setter to include a color saturation setter which sets, as the photographing condition parameter, at least one of a first mode in which the object image appears relatively high in color saturation and a second mode in which the object image appears relatively low in color saturation. The moving member drive controller makes the drive range of the moving member and the optical low-pass filter effect that are defined by the moving member driver when the first mode, in which the object image appears relatively high in color saturation, is set by the color saturation setter greater than the drive range of the moving member and the optical low-pass filter effect that are defined by the moving member driver when the second mode, in which the object image appears relatively low in color saturation, is set by the color saturation setter.

It is desirable for the photographing condition parameter setter to include a photographic sensitivity setter which sets, as the photographing condition parameter, at least one of a high-sensitivity photography mode in which photographic sensitivity is relatively high and a low-sensitivity photographic mode in which the photographic sensitivity is relatively low. The moving member drive controller makes the drive range of the moving member and the optical low-pass filter effect that are defined by the moving member driver when the low-sensitivity photography mode is set by the photographic sensitivity setter greater than the drive range of the moving member and the optical low-pass filter effect that are defined by the moving member driver when the high-sensitivity photography mode is set by the photographic sensitivity setter.

It is desirable for the photographing condition parameter setter comprises a photographic sensitivity setter which sets, as the photographing condition parameter, at least one of a high-sensitivity photography mode in which photographic sensitivity is relatively high and a low-sensitivity photographic mode in which the photographic sensitivity is relatively low. The moving member drive controller makes the drive range of the moving member and the optical low-pass filter effect that are defined by the moving member driver when the low-sensitivity photography mode is set by the photographic sensitivity setter smaller than the drive range of the moving member and the optical low-pass filter effect that are defined by the moving member driver when the high-sensitivity photography mode is set by the photographic sensitivity setter.

The photographing condition parameter setter can independently set more than one the parameter related to the photographing condition. The moving member drive controller stepwisely changes the drive range of the moving member and the optical low-pass filter effect, which are defined by the moving member driver, based on the more than one the parameter related to the photographing condition, independently set by the photographing condition parameter setter.

The photographing control system according to the present invention is provided, including an image sensor, to which an object image that is formed from object-emanating light rays passed through a photographing optical system is exposed, and which converts the object image thus exposed into an electrical pixel signal; a moving member driver which provides an optical low-pass filter effect by making the object-emanating light rays incident on a plurality of pixels of the image sensor which are mutually different in detection color by driving a moving member that includes at least one of a lens which constitutes at least a portion of optical elements including the photographing optical system for formation of the object image and the image sensor, in directions orthogonal to an optical axis of the photographing optical system; a photographing condition parameter setter which sets a parameter related to a photographing condition; and a moving member drive controller which changes a drive range of the moving member and the optical low-pass filter effect, which are defined by the moving member driver, based on the photographing condition parameter that is set by the photographing condition parameter setter.

Advantageous Effects of the Invention

According to the present invention, in a photographing apparatus and a photographing control system which obtain an optical low-pass filter effect by driving an image sensor (moving member), it is possible to obtain an optimum low-pass filter effect according to various photographing condition parameters related to photographing conditions with flexibility, without forcing the user to perform a troublesome manual operation.

BRIEF DESCRIPTION OF DRAWINGS

FIGS. 4(A) and (B) show diagrams illustrating operations for providing an optical low-pass filter effect by driving an image sensor so that it traces a predetermined path, wherein 4(A) is a diagram illustrating the case where the image sensor is driven to trace a rotationally symmetrical circular path about an optical axis of a photographing optical system, and 4(B) is a diagram illustrating the case where the image sensor is driven to trace a rotationally symmetrical square path about the axis of the photographing optical system;

FIGS. 5(A) and (B) show diagrams illustrating the case where the drive range of the image sensor and the optical low-pass filter effect are changed according to the settings of a photographing mode setter (photographing condition parameter setter), wherein FIG. 5(A) illustrates the case where the photographing mode setter has set a portrait photography mode and FIG. 5(B) illustrates the case where the photographing mode setter has set a scene photography mode;

EMBODIMENT

An embodiment of a digital camera (photographing apparatus/photographing control system) 10 according to the present invention will be hereinafter discussed with reference to FIGS. 1 through 8.

Figure 1:
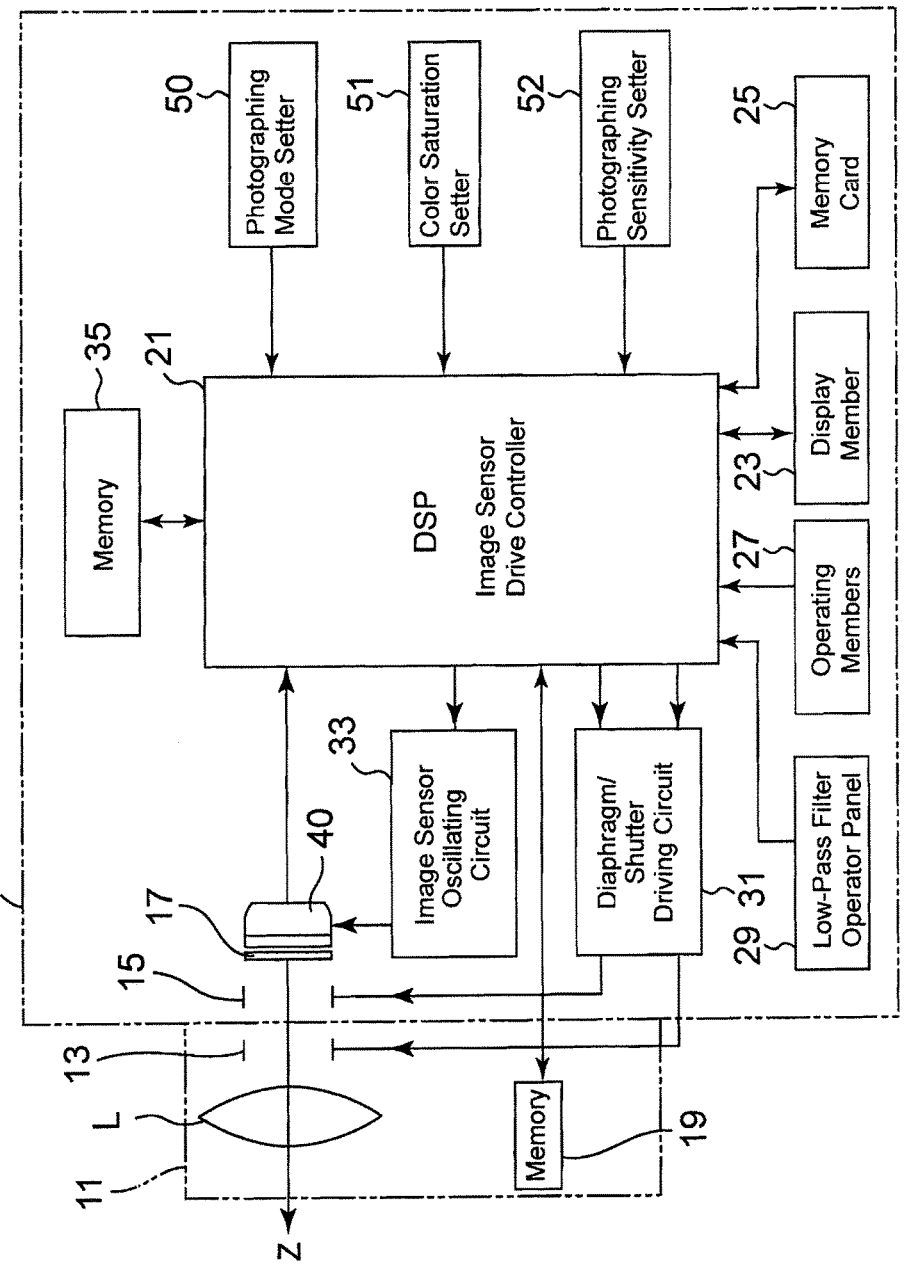
FIG. 1 is a block diagram showing main components of a digital camera (photographing apparatus) according to the present invention.

As shown in FIG. 1, the digital camera 10 is provided with a photographic lens 11 which is detachably attached to the camera body 20 of the digital camera 10. The photographic lens 11 is provided with a photographing lens group L (moving member/shake-correction member) and a diaphragm 13, in that order from the object side (the left side with respect to the drawings), and the camera body 20 is provided with a shutter 15 and an image sensor (moving member/shake-correction member) 17. An object image formed by object-emanating light rays, which enter from the photographing lens group L and pass through the diaphragm 13 and the fully-opened shutter 15, is formed on the image sensor 17 and is exposed. The object image thus formed on the image sensor 17 is converted into an electrical image signal using a large number of pixels arranged in a matrix, and this signal is output as an image signal to a DSP (image sensor drive controller/moving member drive controller/shake correction member drive controller) 21. The DSP 21 performs a predetermined process on the image signal to display an image on a display member (LCD monitor) 23 and writes image data onto a memory card 25. The DSP 21 is connected to operating members 27, a low-pass filter operator panel 29, a diaphragm/shutter drive circuit 31, an image sensor oscillating circuit (image sensor driver/moving member driver/shake-correction member driver) 33 and a memory 35. The operating members 27 include a power switch and a release switch, etc.; the low-pass filter operator panel 29 includes a switch to turn ON and OFF a low-pass filter operation, an adjusting switch to adjust the low-pass filter effect, and a direction selection switch to select the oscillating direction of the image sensor during the low-pass filter operation; a diaphragm/shutter drive circuit 31 is for driving and controlling the operations of the diaphragm 13 and the shutter 15, and data on the low-pass filter has been written into the memory 35. The photographic lens 11 incorporates a memory 19 which has stored therein information on the aperture diameter (aperture value) of the diaphragm 13 and information on the resolving power (MTF) of the photographing lens group L, and the DSP 21 reads this information. The photographing lens group L includes a plurality of lens groups with the diaphragm 13 generally positioned therebetween in the optical axis direction.

The digital camera 10 is equipped with a photographing mode setter 50, a color saturation setter 51 and a photographic sensitivity setter 52 that are provided as photographing condition parameter setters for independently setting parameters related to photographing conditions. The photographing mode setter 50, the color saturation setter 51 and the photographic sensitivity setter 52 are embodied as physical switches contained in the operating members 27 or touchscreen switches using the display member 23.

The photographing mode setter 50 sets at least one of the following two modes as a photographing condition parameter: a portrait photography mode for photographing people as a photographic subject, and a landscape photography mode for photographing a landscape as a photographic subject. In this connection, for instance, a night view mode for photographing landscapes at night and a sport mode for photographing an object that move quickly are known as photographing modes other than the portrait photography mode and the landscape photography mode.

The color saturation setter 51 sets at least one of the following two modes as a photographing condition parameter: a vivid mode (first mode) in which photographed images appear relatively high in color saturation, and a natural mode (second mode) in which photographed images appear relatively low in color saturation. The color saturation settings by the color saturation setter 51 are not limited to the aforementioned two levels: the vivid mode and the natural mode; namely, the color saturation setter 51 can set three or more levels of color saturation settings.

The photographic sensitivity setter 52 sets at least one of the following two modes as a photographing condition parameter: a high-sensitivity photography mode in which photographic sensitivity is relatively high, and a low-sensitivity photographic mode in which photographic sensitivity is relatively low. The photographic sensitivity setter 52 can set the ISO sensitivity at one of at least three levels: ISO 100, ISO 400 and ISO 1600 in the present embodiment; however, the photographic sensitivity setter 52 can also set two levels of photographic sensitivity settings, or four or more levels of photographic sensitivity settings.

Figure 2:
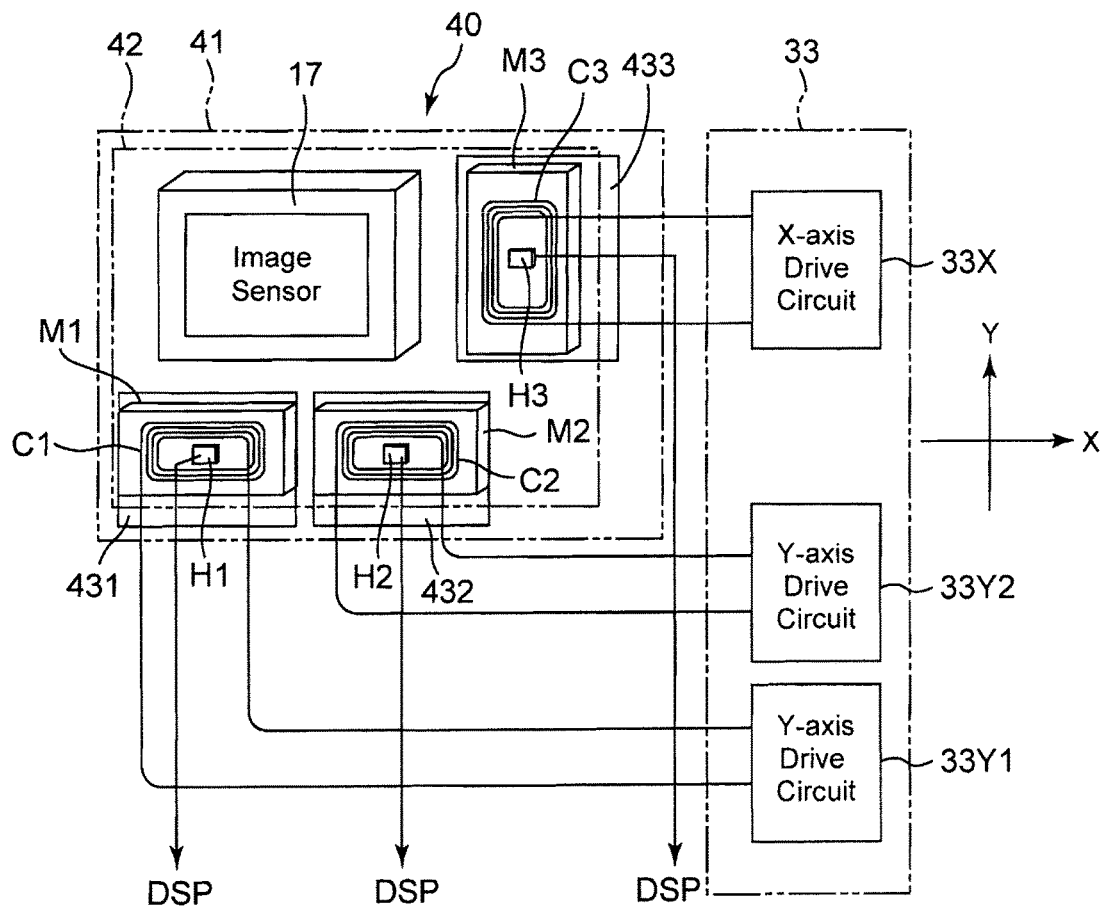
FIG. 2 is a block diagram showing main components of an image shake correcting apparatus (image sensor driver) of the digital camera (photographing apparatus) according to the present invention.
Figure 3:
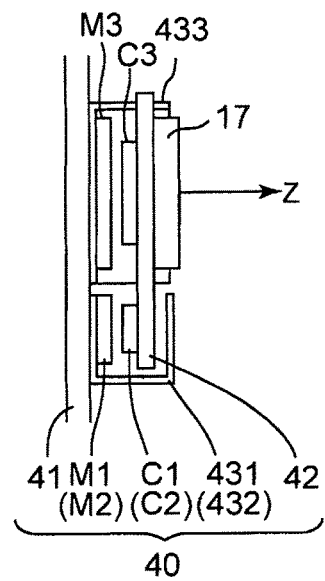
FIG. 3 is a side elevational view of the image shake correcting apparatus (image sensor driver) of the digital camera (photographing apparatus), illustrating the structure thereof.
Figure 5:
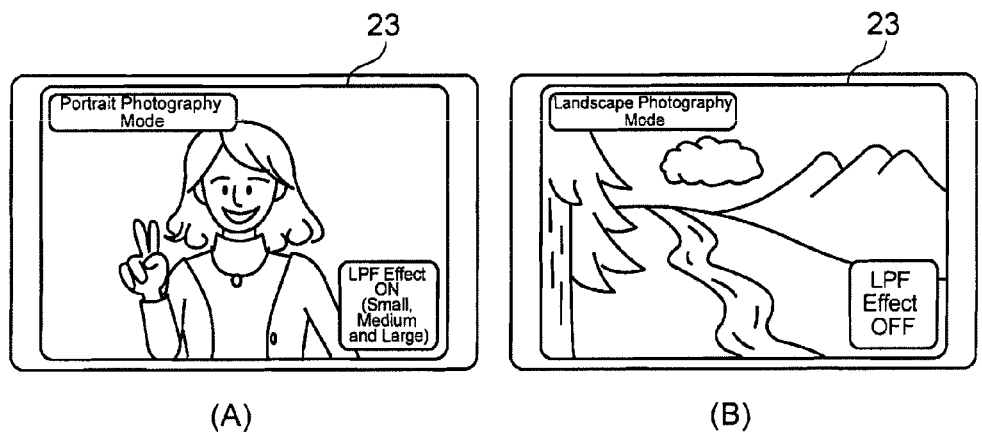

As shown in FIGS. 1 through 3, the image sensor 17 is mounted onto an image shake correcting apparatus (image sensor driver/moving member driver/shake-correction member driver) 40 in a manner to be movable in an X-axis direction and a Y-axis direction (two orthogonal directions) which are orthogonal to an optical axis Z of the photographic lens 11. The image shake correcting apparatus 40 is provided with a fixed support board 41, a movable stage 42, magnets M1, M2 and M3, yokes 431, 432 and 433, and drive coils C1, C2 and C3. The fixed support board 41 is fixed to a structural member of the camera body 20 such as a chassis, the movable stage 42 is slidable relative to the fixed support board 41, the magnets M1, M2 and M3 are fixed to surfaces of the fixed support board 41 which face the movable stage 42; the yokes 431, 432 and 433 are made of a magnetic material and are fixed to the fixed support board 41 to face the magnets M1, M2 and M3 with the movable stage 42 positioned between the fixed support board 41 and the yokes 431, 432 and 433 to form a magnetic circuit between each yoke 431, 432 and 433 and the associated magnet M1, M2 or M3; and the drive coils C1, C2 and C3 are fixed to the movable stage 42 and each generate a driving force by receiving an electric current within the magnetic field of the aforementioned magnetic circuit. Applying an AC voltage to the drive coils C1, C2 and C3 from the image sensor oscillating circuit 33 causes the movable stage 42 to oscillate relative to the fixed support board 41.

In this embodiment, a magnetic driver configured of the magnet M1, the yoke 431 and the drive coil C1, and a magnetic driver configured of the magnet M2, the yoke 432 and the drive coil C2 (i.e., two magnetic drivers) are arranged along the lengthwise direction of the image sensor 17 (horizontal direction/the X-axis direction) with a predetermined distance therebetween; and a magnetic driver (one magnetic driver) configured of the magnet M3, the yoke 433 and the drive coil C3 is arranged along the short side direction of the image sensor 17 that is orthogonal to the lengthwise direction of the image sensor 17 (perpendicular (orthogonal) direction/the Y-axis direction). The image sensor oscillating circuit 33 is provided with Y-axis drive circuits 33Y1 and 33Y2 and an X-axis drive circuit 33X which independently control currents supplied to the drive coils C1, C2 and C3, respectively.

Hall sensors H1, H2 and H3 which detect the magnetic forces of the magnets M1, M2 and M3 to detect the position of the movable stage 42 are arranged on the fixed support board 41 in the vicinity of (in the central hollow spaces of) the drive coils C1 through C3, respectively. The position in the Y-axis direction and the inclination (rotation) of the movable stage 42 are detected by the Hall sensors H1 and H2, and the position of the movable stage 42 in the X-axis direction is detected by the Hall sensor H3. The DSP 21 passes a driving current through each drive coil C1 through C3 via the Y-axis drive circuit 31Y1 and 31Y2 and the X-axis drive circuit 33X while detecting the position of the movable stage 42 from the outputs of the Hall sensors H1, H2 and H3 to move the movable stage 42 along a predetermined path and track at a predetermined speed (period). During image shake correcting operation, the DSP 21 detects vibrations of the digital SLR camera 10 using acceleration sensors (not shown) and controls the driving of the movable stage 42 (the image sensor 17) to reduce image shake via the image sensor oscillating circuit 33 in a manner to prevent the object image from moving relative to the image sensor 17.

The image sensor oscillating circuit 33 and the image shake correcting apparatus 40 constitute an image sensor driver (moving member driver/shake-correction member driver) which reproduces the effects of an optical low-pass (may also be referred to as an LPF effect in the following descriptions) by making object-emanating light rays incident on a plurality of pixels of the image sensor 17 which are mutually different in detection color by driving the image sensor 17 in a manner such that the image sensor 17 traces a predetermined path in a plane orthogonal to the optical axis Z of a photographic optical system.

With reference to FIGS. 4(A) and (B), the low-pass filter operation of the image sensor driver (the image sensor oscillating circuit 33 and the image shake correcting apparatus 40) that provides an LPF effect using the image sensor 17 by driving the image sensor 17 so that it traces a predetermined path will be discussed hereinafter. In these drawings, the image sensor 17 is provided with a large number of pixels 17a which are arranged in a matrix at a predetermined pixel pitch P on the light receiving surface, and one of color filters R, G and B arranged in Bayer pattern is positioned on the front surface of each pixel 17a. Each pixel 17a detects a color of object-emanating light rays which are incident on the pixel 17a after passing through the color filter R, G or B on the front surface thereof; specifically, each pixel 17a converts light of the color component (color band) into an electrical signal and accumulates electric charge according to the intensity (brightness) of the light.

FIG. 4(A) shows the case where the image sensor 17 is driven to trace a rotationally symmetrical circular path having the center thereof on the optical axis Z of the photographic optical system. This circular path is a circular closed path having a radius r of $2^{1/2}/2$ times the pixel pitch P of the image sensor 17. FIG. 4(B) shows the case where the image sensor 17 is driven to trace a rotationally symmetrical square path having the center thereof on the optical axis Z of the photographic optical system. This square path is a square closed path each side of which has a length equal to the pixel pitch P of the image sensor 17. In FIG. 4(B), the image sensor 17 is driven alternately in the Y-axis direction of the pixels 17a, which is parallel to one of mutually orthogonal alignment directions (perpendicular direction) of the pixels 17a, and in the X-axis direction of the pixels 17a, which is parallel to the other direction (horizontal direction), per unit of the pixel pitch P so that the image sensor 17 moves in the square closed path.

If the image sensor 17 is driven to trace the predetermined circular or square path during an exposure as shown in FIGS. 4(A) and (B), the object-emanating light rays (ray bundle) incident on the center of each color filter R, G and B (each pixel 17a) are equally incident on four color filters R, G, B and G, so that the effect equivalent to that obtained using an optical low-pass filter is obtained. Namely, the light rays incident on any of the color filters R, G, B and G (the pixels 17a) are reliably incident on the peripheral color filters R, G, B and G (the peripheral pixels 17a), so that the effect (an LPF effect) equivalent to that obtained in the case where the light rays are passed through an optical low-pass filter is obtained.

Additionally, by stepwise changing the drive range of the image sensor 17 (by varying the radius r in the case where the path is circular in shape or by varying the length of one side of the path in the case where the path is square in shape), the intensity of the LPF effect can be adjusted stepwise. Accordingly, the LPF effect is enhanced as the radius r of the circular path or the length of one side of the square path is increased (as the range of the pixels 17a (the color filters R, G, B and G) of the image sensor 17, on which object-emanating light rays are incident, which are mutually different in detection color is enlarged). On the other hand, the LPF effect is weakened as the radius r or the length of the one side is decreased (as the range of the pixels 17a (the color filters R, G, B and G) of the image sensor 17, on which object-emanating light rays are incident, which are mutually different in detection color is reduced). As shown in Table 1, the drive range of the image sensor 17 and the intensity of the LPF effect can be changed between four stages: "OFF", "small", "medium" and "large." The state in which both the drive range of the image sensor 17 and the LPF effect are "OFF" refers to a state where the image sensor 17 is not driven, and hence the LPF effect is not obtained.

TABLE 1

| Drive range of Image Sensor 17 | OFF | Small | Medium | Large |
|---|---|---|---|---|
| LPF Effect by Image Sensor 17 | OFF | Small | Medium | Large |

Additionally, based on the photographing condition parameters set by the photographing mode setter 50, the color saturation setter 51 and the photographic sensitivity setter 52, the DSP (image sensor drive controller) 21 stepwisely changes the drive range of the image sensor 17 and the LPF effect that are defined by the image sensor driver (the image sensor oscillating circuit 33 and the image shake correcting apparatus 40).

As shown in FIGS. 5(A) and (B), the DSP 21 makes the drive range of the image sensor 17 and the LPF effect that are defined when the portrait photography mode is set by the photographing mode setter 50 greater than the drive range of the image sensor 17 and the LPF effect that are defined when the landscape photography mode is set by the photographing mode setter 50. In the example shown in FIGS. 5(A) and (B), the DSP 21 sets each of the drive range of the image sensor 17 and the LPF effect to one of "small", "medium" and "large" (ON) when the portrait photography mode is set by the photographing mode setter 50, and the DSP 21 sets each of the drive range of the image sensor 17 and the LPF effect to "OFF" when the landscape photography mode is set by the photographing mode setter 50. When photographing a person or people, there is a possibility of the image quality deteriorating due to moiré and false color occurring at, e.g., the hair, so that it is desirable to prevent moiré and false color from occurring by increasing the drive range of the image sensor 17 and the LPF effect. Whereas, in photographing a landscape, it is desirable to reduce (turn OFF) the drive range of the image sensor 17 and the LPF effect to photograph details such as tree branches and leaves with high-definition image quality.

Figure 6:
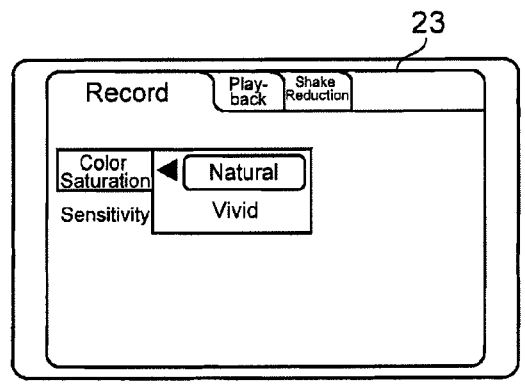
FIG. 6 is diagram illustrating the case where the drive range of the image sensor and the optical low-pass filter effect are changed according to the settings of a color saturation setter (photographing condition parameter setter)

As shown in FIG. 6, the DSP 21 makes the drive range of the image sensor 17 and the LPF effect that are defined when the vivid mode is set by the color saturation setter 51 greater than the drive range of the image sensor 17 and the LPF effect that are defined when the natural mode is set by the color saturation setter 51. In the example shown in FIG. 6, the DSP 21 sets each of the drive range of the image sensor 17 and the LPF effect to one of "small", "medium" and "large" (ON) when the vivid mode is set by the color saturation setter 51, and the DSP 21 sets each of the drive range of the image sensor 17 and the LPF effect to "OFF" when the natural mode is set by the color saturation setter 51. In general, the higher the color saturation setting, the easier the image quality deteriorates due to the occurrence of moiré and false color. Accordingly, it is desirable to prevent moiré and false color from occurring by increasing the drive range of the image sensor 17 and the LPF effect when the vivid mode is set by the color saturation setter 51, and to emphasize the sense of resolution of photographed images by reducing (turning OFF) the drive range of the image sensor 17 and the LPF effect when the natural mode is set by the color saturation setter 51.

Figure 7:
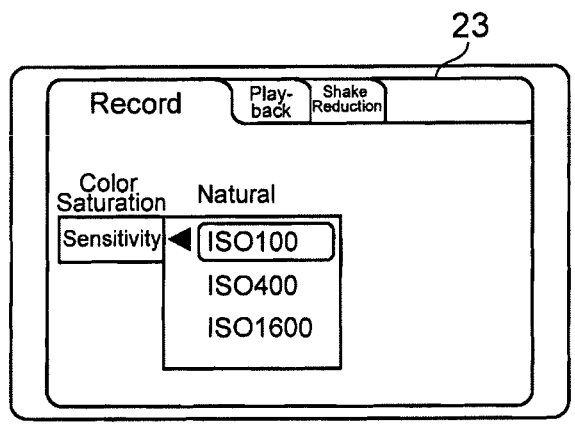
FIG. 7 is a first diagram illustrating the case where the drive range of the image sensor and the optical low-pass filter effect are changed according to the settings of a photographic sensitivity setter (photographing condition parameter setter)

As shown in FIG. 7, the DPS 21 makes the drive range of the image sensor 17 and the LPF effect that are defined when the low-sensitivity photography mode is set by the photographic sensitivity setter 52 greater than the drive range of the image sensor 17 and the LPF effect that are defined when the high-sensitivity photography mode is set by the photographic sensitivity setter 52. In the example shown in FIG. 7, the DSP 21 sets each of the drive range of the image sensor 17 and the LPF effect to "large" when the ISO sensitivity is set at ISO 100 by the photographic sensitivity setter 52, the DSP 21 sets each of the drive range of the image sensor 17 and the LPF effect to "small" when the ISO sensitivity is set at ISO 400 by the photographic sensitivity setter 52, and the DSP 21 sets each of the drive range of the image sensor 17 and the LPF effect to "OFF" when the ISO sensitivity is set at ISO 1600 by the photographic sensitivity setter 52. In the embodiment shown in FIG. 7, the drive range of the image sensor 17 and the LPF effect are increased to prevent moiré and false color from occurring in the low-sensitivity photographing state, while the drive range of the image sensor 17 and the LPF effect are reduced (turned OFF) in the high-sensitivity photographing state on the assumption that the components of moiré and false color are removed with random noise by an image processing performed after an exposure.

Figure 8:
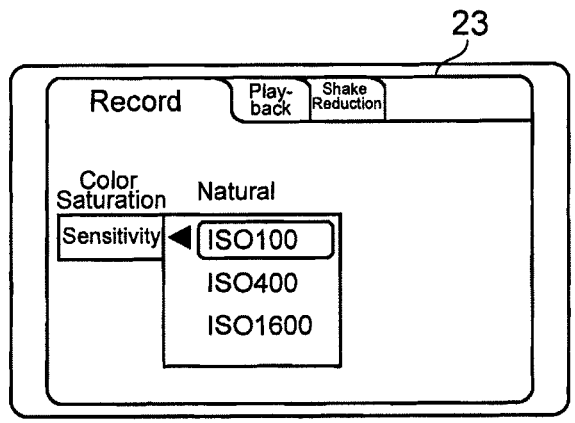
FIG. 8 is a second diagram illustrating the case where the drive range of the image sensor and the optical low-pass filter effect are changed according to the settings of a photographic sensitivity setter (photographing condition parameter setter).

As shown in FIG. 8, the DSP 21 makes the drive range of the image sensor 17 and the LPF effect that are defined when the low-sensitivity photography mode is set by the photographic sensitivity setter 52 smaller than the drive range of the image sensor 17 and the LPF effect that are defined when the high-sensitivity photography mode is set by the photographic sensitivity setter 52. In the examples shown in FIG. 8, the DSP 21 sets each of the drive range of the image sensor 17 and the LPF effect to "OFF" when the ISO sensitivity is set at ISO 100 or 400 by the photographic sensitivity setter 52, and the DSP 21 sets each of the drive range of the image sensor 17 and the LPF effect to one of "small", "medium" and "large" (ON) when the ISO sensitivity is set at ISO 1600 by the photographic sensitivity setter 52. The embodiment shown in FIG. 8 is based on the idea that no adverse effect occurs even if the drive range of the image sensor 17 and the LPF effect are increased since the imaging process performed after an exposure lowers resolution.

The embodiment shown in FIG. 7 is suitable for the case where the processor which plays a role in the low-pass filter driving and the image processing is low in performance, which tends to cause an increase of the load on the processor, and the embodiment shown in FIG. 8 is suitable for the case where a high-sensitivity noise processing according to an image processing is powerful. Although the embodiments shown in FIGS. 7 and 8 are incompatible in description with each other, it is desirable to appropriately determine whether or not either embodiment should be adopted according to the performance and the like of the processor of the digital camera 10.

Whether or not the DSP 21 changes the drive range of the image sensor 17 and the LPF effect with a priority given to one of the photographing condition parameters set by the photographing mode setter 50, the color saturation setter 51 and the photographic sensitivity setter 52 can be determined by a manual setting by the user or an automatic setting on the digital camera 10. For instance, assuming the case where the portrait mode is set by the photographing mode setter 50 and the natural mode is set by the color saturation setter 51, the drive range of the image sensor 17 and the LPF effect are each set at one of "small", "medium" and "large" (ON) when a setting of assigning a higher priority to the photographing condition parameter set by the photographing mode setter 50 than that set by the color saturation setter 51, and the drive range of the image sensor 17 and the LPF effect are each set at "OFF" when a setting of assigning a higher priority to the photographing condition parameter set by the saturation setter 51 than that set by the photographing mode setter 50. Whereas, an embodiment in which the drive range of the image sensor 17 and the LPF effect are changed by combining the photographing condition parameters set by the photographing mode setter 50, the saturation setter 51 and the photographic sensitivity setter 52 in a complex manner is also possible.

As described above, in the present embodiment of the digital camera (photographing apparatus) 10, the photographing condition parameter setters 50, 51 and 52 set parameters related to photographing conditions, and the image sensor drive controller 21 stepwisely changes the drive range of the image sensor 17 and the optical low-pass filter effect, which are defined by the image sensor drivers 33 and 40, based on the photographing condition parameters set by the photographing condition parameter setters 50, 51 and 52. This makes it possible to obtain an optimum low-pass filter effect according to various photographing condition parameters related to photographing conditions with flexibility without forcing the user to perform a troublesome manual operation.

Although an embodiment in which the image sensor 17 is driven as "a moving member" in a plane orthogonal to the optical axis has been illustrated by example in the above described embodiment, the present invention is not limited thereto. For instance, an embodiment in which a lens that constitutes at least a portion of the optical elements, including the photographing lens group (photographing optical system) L, for the formation of an object image is driven as "a moving member" in a plane orthogonal to the optical axis by voice coil motors (drive mechanism) provided in the photographic lens 11 is also possible. Alternatively, it is also possible that both the image sensor 17 and a lens that constitutes a portion of the photographing lens (photographing optical system) L are driven as "moving members" in a plane orthogonal to the optical axis. In either of these embodiments, an optical low-pass filter effect can be obtained by varying the position of the formation of an object image on the image sensor 17 to correct image shake and making object-emanating light rays incident on a plurality of pixels of the image sensor 17 which are mutually different in detection color.

Although the case where the predetermined path that the image sensor 17 traces is a rotationally symmetrical circular or square path having the center thereof on the optical axis Z of the photographic optical system has been illustrated in the above described embodiment, the present invention is not limited thereto; for instance, the predetermined path that the image sensor 17 traces can be defined as a linearly-reciprocal moving path which lies in a plane orthogonal to the optical axis Z of the photographic optical system.

INDUSTRIAL APPLICABILITY is desirable that the photographing apparatus and the photographing control system according to the present invention be used as a photographing apparatus and a photographing control system of a digital camera, etc.

REFERENCE SIGNS LIST

10 Digital camera (Photographing apparatus/Photographing control system)
11 Photographic lens
L Photographing lens group (Photographing optical system) (Moving member/Shake-correction member)
13 Diaphragm (Photographing optical system)
15 Shutter
17 Image sensor (Moving member/Shake-correction member)
17a Pixel
19 Memory
20 Camera body
21 DSP (Image sensor drive controller/Moving member drive controller/Shake-correction member controller)
23 Display member (LCD monitor)
25 Memory card
27 Operating member
29 Low-pass filter operator panel
31 Diaphragm/shutter drive circuit
33 Image sensor oscillating circuit (Image sensor driver/Moving member driver/Shake-correction member driver)
33X X-axis drive circuit
33Y1 33Y2 Y-axis drive circuit
35 Memory
40 Image shake correcting apparatus (Image sensor driver/Moving member driver/Shake-correction member driver)
41 Fixed support board
42 Movable stage
431 432 433 Yoke
Photographing mode setter (Photographing condition parameter setter)
51 Color saturation setter (Photographing condition parameter setter)
52 Photographic sensitivity setter (Photographing condition parameter setter)
C1 C2 C3 Drive coil
H1 H2 H3 Hall sensor
M1 M2 M3 Magnet
R G B Color filter

The invention claimed is:

1. A photographing control system comprising:
an image sensor, to which an object image that is formed from object-emanating light rays passed through a photographing optical system is exposed, and which converts the object image thus exposed into an electrical pixel signal;
a moving member driver which provides an optical low-pass filter effect, by making said object-emanating light rays incident on a plurality of pixels of said image sensor which are mutually different in detection color, by driving a moving member in directions orthogonal to an optical axis of said photographing optical system, the moving member including at least one of a lens or said image sensor, the lens constituting at least a portion of said photographing optical system that forms the object image;
a photographing condition parameter setter which sets a parameter related to a photographing condition; and
a moving member drive controller which changes a drive range of said moving member and said optical low-pass filter effect, which are defined by said moving member driver, based on said photographing condition parameter that is set by said photographing condition parameter setter,
wherein said photographing condition parameter setter comprises a photographing mode setter which sets, as said photographing condition parameter, at least one of a portrait photography mode for photographing at least one person as a photographic subject or a landscape photography mode for photographing a landscape as a photographic subject, and
wherein said moving member drive controller makes said drive range of said moving member and said optical low-pass filter effect that are defined by said moving member driver when said portrait photography mode is set by said photographing mode setter greater than said drive range of said moving member and said optical low-pass filter effect that are defined by said moving member driver when said landscape photography mode is set by said photographing mode setter.

2. The photographing control system according to claim 1,
wherein said photographing condition parameter setter can independently set more than one parameter related to said photographing condition, and
wherein said moving member drive controller stepwisely changes said drive range of said moving member and said optical low-pass filter effect, which are defined by said moving member driver, based on said more than one parameter related to said photographing condition, independently set by said photographing condition parameter setter.

3. A photographing control system comprising:
an image sensor, to which an object image that is formed from object-emanating light rays passed through a photographing optical system is exposed, and which converts said object image thus exposed into an electrical pixel signal;
a moving member driver which provides an optical low-pass filter effect, by making said object-emanating light rays incident on a plurality of pixels of said image sensor which are mutually different in detection color, by driving a moving member in directions orthogonal to an optical axis of said photographing optical system, the moving member including at least one of a lens or said image sensor, the lens constituting at least a portion of said photographing optical system that forms the object image;
a photographing condition parameter setter which sets a parameter related to a photographing condition; and
a moving member drive controller which changes a drive range of said moving member and said optical low-pass filter effect, which are defined by said moving member driver, based on said photographing condition parameter that is set by said photographing condition parameter setter,
wherein said photographing condition parameter setter comprises a color saturation setter which sets, as said photographing condition parameter, at least one of a first mode in which said object image appears relatively high in color saturation or a second mode in which said object image appears relatively low in color saturation, and
wherein said moving member drive controller makes said drive range of said moving member and said optical low-pass filter effect that are defined by said moving member driver when said first mode, in which said object image appears relatively high in color saturation, is set by said color saturation setter greater than said drive range of said moving member and said optical low-pass filter effect that are defined by said moving member driver when said second mode, in which said object image appears relatively low in color saturation, is set by said color saturation setter.

4. A photographing control system comprising:

an image sensor, to which an object image that is formed from object-emanating light rays passed through a photographing optical system is exposed, and which converts said object image thus exposed into an electrical pixel signal;

a moving member driver which provides an optical low-pass filter effect, by making said object-emanating light rays incident on a plurality of pixels of said image sensor which are mutually different in detection color, by driving a moving member in directions orthogonal to an optical axis of said photographing optical system, the moving member including at least one of a lens or said image sensor, the lens constituting at least a portion of said photographing optical system that forms the object image;

a photographing condition parameter setter which sets a parameter related to a photographing condition; and a moving member drive controller which changes a drive range of said moving member and said optical low-pass filter effect, which are defined by said moving member driver, based on said photographing condition parameter that is set by said photographing condition parameter setter, wherein said photographing condition parameter setter comprises a photographic sensitivity setter which sets, as said photographing condition parameter, at least one of a high-sensitivity photography mode in which photographic sensitivity is relatively high or a low-sensitivity photographic mode in which said photographic sensitivity is relatively low, and wherein said moving member drive controller makes said drive range of said moving member and said optical low-pass filter effect that are defined by said moving member driver when said low-sensitivity photography mode is set by said photographic sensitivity setter greater than said drive range of said moving member and said optical low-pass filter effect that are defined by said moving member driver when said high-sensitivity photography mode is set by said photographic sensitivity setter.

5. A photographing control system comprising:

an image sensor, to which an object image that is formed from object-emanating light rays passed through a photographing optical system is exposed, and which converts said object image thus exposed into an electrical pixel signal;

a moving member driver which provides an optical low-pass filter effect, by making said object-emanating light rays incident on a plurality of pixels of said image sensor which are mutually different in detection color, by driving a moving member in directions orthogonal to an optical axis of said photographing optical system, the moving member including at least one of a lens or said image sensor, the lens constituting at least a portion of said photographing optical system that forms the object image;

a photographing condition parameter setter which sets a parameter related to a photographing condition; and a moving member drive controller which changes a drive range of said moving member and said optical low-pass filter effect, which are defined by said moving member driver, based on said photographing condition parameter that is set by said photographing condition parameter setter, wherein said photographing condition parameter setter comprises a photographic sensitivity setter which sets, as said photographing condition parameter, at least one of a high-sensitivity photography mode in which photographic sensitivity is relatively high or a low-sensitivity photographic mode in which said photographic sensitivity is relatively low, and wherein said moving member drive controller makes said drive range of said moving member and said optical low-pass filter effect that are defined by said moving member driver when said low-sensitivity photography mode is set by said photographic sensitivity setter smaller than said drive range of said moving member and said optical low-pass filter effect that are defined by said moving member driver when said high-sensitivity photography mode is set by said photographic sensitivity setter.

* * * * *